United States Patent
Monin

(10) Patent No.: US 6,243,358 B1
(45) Date of Patent: Jun. 5, 2001

(54) PROCESS AND DEVICE FOR ALLOCATING RESOURCES IN A PACKET TRANSMISSION DIGITAL NETWORK

(75) Inventor: Wei Monin, Lannion (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 09/018,537

(22) Filed: Feb. 4, 1998

(30) Foreign Application Priority Data

Feb. 7, 1997 (FR) .................................................. 97 01433

(51) Int. Cl.[7] ................................ H04J 3/00; H04M 3/00
(52) U.S. Cl. .......................... 370/229; 370/235; 709/223
(58) Field of Search ..................................... 370/229–236, 370/468, 428, 429, 411, 412–419, 252–253; 709/223–229

(56) References Cited

U.S. PATENT DOCUMENTS

| | | | |
|---|---|---|---|
| 4,799,215 | * 1/1989 | Suzuki | 370/235 |
| 4,970,714 | * 11/1990 | Chen et al. | 370/236 |
| 5,063,562 | * 11/1991 | Barzilai et al. | 370/236 |
| 5,168,497 | * 12/1992 | Ozaki et al. | 370/429 |
| 5,432,824 | * 7/1995 | Zheng et al. | 370/236 |
| 5,515,359 | * 5/1996 | Zheng | 370/231 |
| 5,528,591 | * 6/1996 | Lauer | 370/231 |
| 5,852,602 | * 12/1998 | Sugawara | 370/231 |
| 5,898,671 | * 4/1999 | Hunt et al. | 370/235 |

FOREIGN PATENT DOCUMENTS

A1 0 275 678   7/1988 (EP) .

OTHER PUBLICATIONS

Ozveren, C. et al. "Reliable and Efficient Hop–by–Hop Flow Control." *Computer Communication Review*, v24, No. 4, Oct. 1, 1994, pp. 89–100.

H.T. Kung et al., "Credit–Based Flow Control for ATM Networks: Credit Update Protocol, Adaptive Credit Allocation, and Statistical Multiplexing", ACM, pp. 101–114, 1994.

* cited by examiner

*Primary Examiner*—Wellington Chin
*Assistant Examiner*—Steven Nguyen
(74) *Attorney, Agent, or Firm*—Oliff & Berridge, PLC

(57) ABSTRACT

In a packet data transmission digital network, a data receiver node dispatches to an adjacent data sender node packets of credits containing information about its capacity to receive data packets; the sender dispatches the data packets which it needs to transmit so long as it has sufficient credits; when its credits are exhausted, it continues to dispatch, in advance, the waiting data packets and preserves each data packet sent in advance until reception thereof is confirmed by the arrival of specific packets originating from the receiver; the receiver dispatches to the sender information indicating the lost data packets; the sender retransmits the data packets whose loss has been signalled by the receiver and destroys the data packets which were sent in advance and preceding the lost data packets.

9 Claims, 2 Drawing Sheets

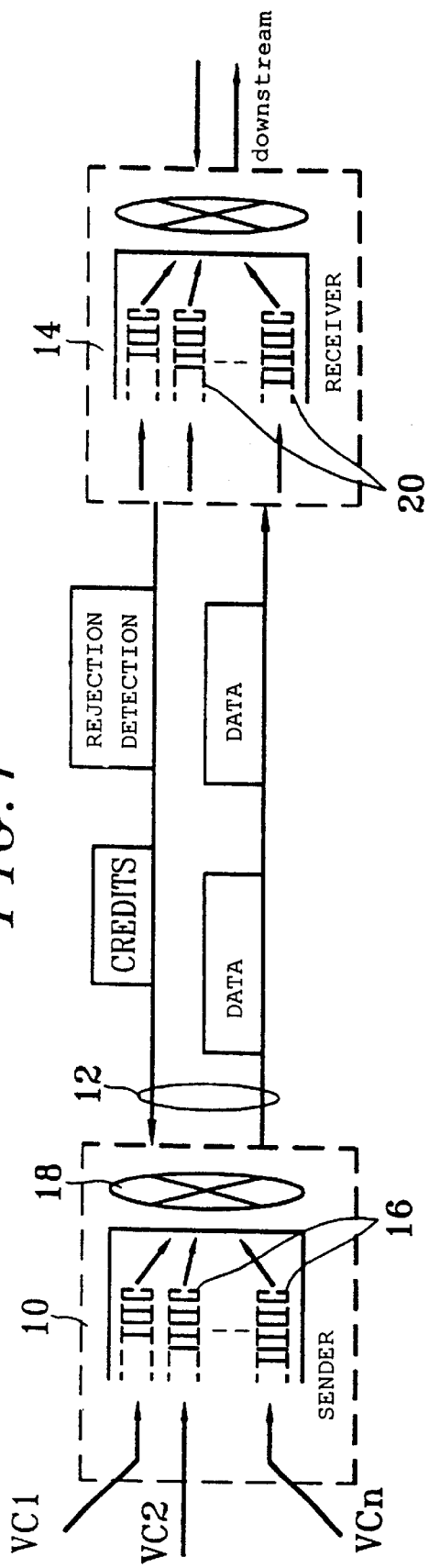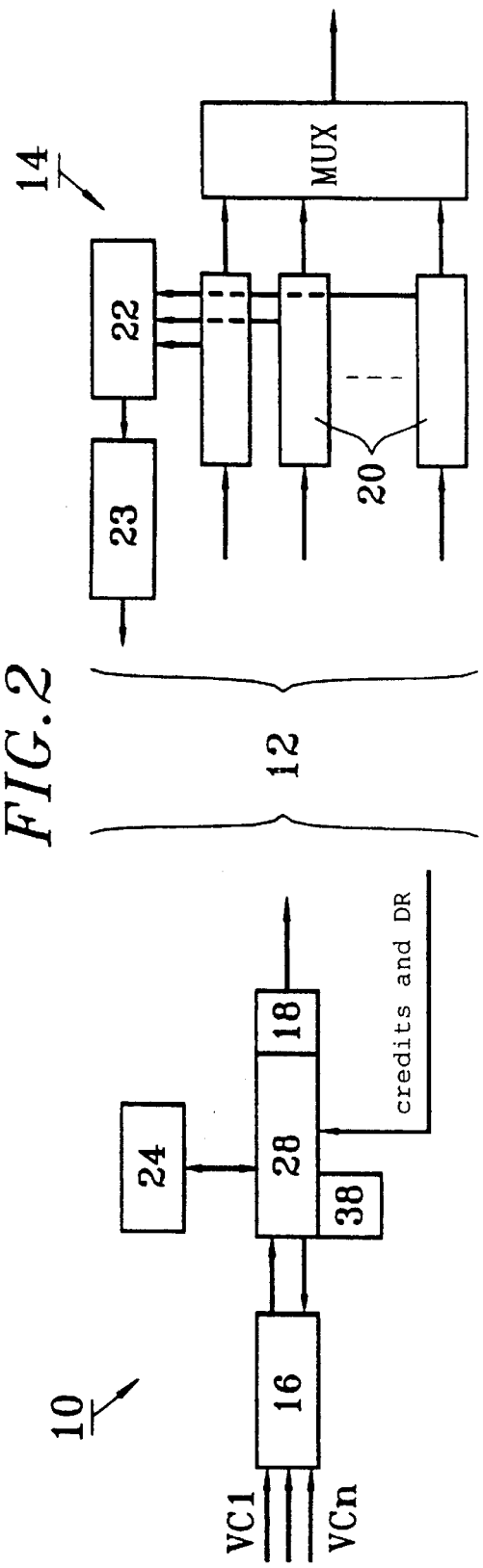

PROCESS AND DEVICE FOR ALLOCATING RESOURCES IN A PACKET TRANSMISSION DIGITAL NETWORK

TECHNICAL FIELD

The present invention relates to a process for allocating resources in a packet transmission digital network.

BACKGROUND OF THE INVENTION

In networks for transmitting data, in packet mode, which exhibit a high bit rate, of the order of 34 Mbit/s to 622 Mbit/s for example, the behaviour of the sources is generally very irregular.

Moreover, while crossing a network, a set of data may pass through transmission links which support very different bit rates.

Even when the capacities of the various transmission links are identical, several data streams originating from different nodes may show up simultaneously at a particular input of a node, creating a "bottleneck" liable to give rise to a state of congestion in the network.

It is sought both to make the best use of the available passband, by authorizing the sources to send as soon as this is possible and to prevent congestion leading to data loss, by slowing down the sources as appropriate: this is referred to as flow control.

Flow control methods are already known, two main families being distinguishable: flow control based on allocating credits and flow control based on allocating bit rates; the invention lies in the first family.

The principle of flow control based on allocating credits is as follows: a sender is prohibited from transmitting data so long as it has not received from the receiver the indication that the receiver is able to accommodate them. To do this, the receiver regularly dispatches packets of credits to the sender, containing information about its capacity to receive data.

The number of "credits" transported by each packet of credits dispatched by the receiver to the sender corresponds, for each virtual input channel of the sender, to the number of unoccupied slots in an input buffer register assigned to this virtual channel. Various algorithms for managing credits have been proposed. Reference can be made for example to the article by H. T. Kung et al., "Credit-based flow control for ATM networks: credit update protocol, adaptive credit allocation and statistical multiplexing", ACM 1994.

A drawback of this process is due to the time required for the control information to make its way back to the sender. The sender's reaction to a request from the receiver is therefore delayed, which may cause under-utilization of the resources, this being all the greater the larger the distance between the transmitter node and the receiver node. If for example this distance is 500 km, the propagation time Rtt is 5 ms. The upstream or sender node therefore only reacts to a dispatch of credits 5 ms after the instant of availability. This delay Rtt corresponds to the send duration for 1768 packets of 53 bytes at 150 Mbit/s. Unless extremely long input buffers are used at the receiver node, this method of allocating credits results in under-utilization of the transmission link between the sender and receiver nodes.

In the present document, unless advised otherwise, the term "transmitting a packet" is regarded as meaning dispatching this packet and erasing it from the buffer which stores this packet. If this is not the case, explicit mention will be made that the sender "preserves" the said packet.

SUMMARY OF THE INVENTION

The objective of the present invention is to provide a flow control process with allocation of credits which makes it possible to do away with the limitations related to the propagation time Rtt.

In order to achieve this objective, the present invention proposes a process for allocating resources in a packet data transmission digital network, between a data sender node and an adjacent data receiver node which resends in the downstream direction, according to which:

(a) the receiver node dispatches to the sender node packets of credits containing information about the capacity of the receiver node to receive data packets originating from the said sender node;

(b) the sender dispatches the data packets which it needs to transmit so long as it has sufficient credits;

wherein:

(c) when its credits are exhausted, the sender node continues to dispatch, in advance, the waiting data packets which it needs to transmit and preserves each data packet sent in advance until reception thereof is confirmed by the arrival of specific packets originating from the receiver;

(d) the receiver dispatches to the sender information indicating the lost data packets;

(e) the sender retransmits the data packets whose loss has been signalled by the receiver and destroys the data packets which were sent in advance and preceding the lost data packets.

In a particular embodiment, the data packets sent bear a sequence number and the packets of credits contain the highest one of said sequence numbers of said data packets which the receiver is ready to receive.

If the sender possesses several queues respectively associated with several network propagation channels, the data packets being sent in the order of their sequence number, the sender first transmits data packets originating from those of the queues for which the sequence number contained in the last packet of credits received originating from the receiver is strictly greater than the number of the last data packet dispatched, and the sender then transmits, in advance, data packets originating from those of the queues for which sending in advance is authorized (see below), for which the sequence number contained in the last packet of credits received originating from the receiver is less than or equal to the number of the last data packet dispatched and for which the difference between the two sequence numbers is smallest, the sender preserving the data packets transmitted in advance.

If the receiver possesses several queues associated with several network propagation channels, upon the arrival of a data packet with sequence number m which cannot be admitted at the receiver, through lack of space in the corresponding queue, while the preceding data packet in respect of this queue has been admitted, the receiver dispatches to the sender a rejection detection packet which includes the sequence number m and systematically rejects all the succeeding data packets, until the arrival, by retransmission, of a fresh version of that data packet whose sequence number is m.

When the sender receives a packet of credits, respectively a rejection detection packet, originating from the receiver, it destroys all the data packets, necessarily sent in advance, whose sequence number is less than or equal to, respectively less than, the sequence number indicated in the packet of credits, respectively in the rejection detection packet.

When the sender receives a rejection detection packet originating from the receiver, it disables the sending in advance of data packets in respect of the relevant propagation channel, until the arrival of a packet of credits which includes a sequence number greater than or equal to the sequence number of the first data packet waiting to be resent or to be transmitted next over this propagation channel.

All these operations may be controlled by programming a processor or controller or performed by hard-wired logic.

In a particular embodiment, the receiver dispatches a packet of credits to the sender as soon as one or the other of the following events occurs: (i) the number of data packets which have departed downstream, since the sending of the last packet of credits to the sender, is equal to a predetermined number; (ii) a predetermined duration of non-sending of packets of credits has elapsed since the sending of the last packet of credits to the sender. In case (ii), the number of credits dispatched by the receiver to the sender may be zero.

By way of non-limiting example, the duration of non-sending may be chosen equal to half the time for the round trip propagation of a data packet between the sender and receiver nodes.

The present invention also proposes a device for allocating resources in a packet data transmission digital network, comprising:

a data receiver node which includes a predetermined number n of input buffers, respectively associated with n virtual channels which correspond to several sources for sending data in the network, a module for monitoring the fill level of these buffers, said module being connected to each of the input buffers, and a send module, connected to the monitoring module, for constructing packets of credits and rejection detection packets containing information about the capacity of the receiver node to receive data packets;

a data sender node which includes n input buffers respectively associated with the n virtual channels, a memory for storing the values of the credits, said values being updated upon receipt of a packet of credits originating from the receiver and upon the sending of a data packet to the receiver, a management module, connected to the memory, which includes an output multiplexing module, and a plurality of registers, respectively associated with the n virtual channels, each register containing a sequence number of the next data packet to be transmitted over the respective virtual channel, the management module being programmed so as to control the transmission, said transmission occurring possibly in advance, of the data packets to the receiver as a function of the values of credits, to control, when a rejection detection packet is received originating from the receiver node, the deletion, from the input buffer of the relevant virtual channel, of those data packets whose sequence number is less than the number indicated in the rejection detection packet and the prohibiting, over this virtual channel, of the transmission in advance, and to control, when a packet of credits is received, the deletion, from the buffer cf the relevant virtual channel, of those data packets, necessarily sent in advance, whose sequence number is less than or equal to the number indicated in the packet of credits and the possible reactivation of the sending in advance if the latter was prohibited; and a transmission link joining the sender node to the receiver node, over which are sent, on the one hand, from the sender node to the receiver node, data packets, and on the other hand, from the receiver node to the sender node, packets of credits and rejection detection packets.

BRIEF DESCRIPTION OF THE DRAWINGS

The above characteristics as well as others will emerge better on reading the following description of a particular embodiment, given by way of non-limiting example. The description refers to the drawings which accompany it, in which:

FIG. 1 represents diagrammatically a sender node/receiver node pair with sending of credit and rejection detection packets by the receiver and sending of data packets by the sender;

FIG. 2 is a basic diagram of the construction of a sender and of a receiver;

DETAILED DESCRIPTION OF THE PREFERRED EMBODIMENTS

Figure 3:
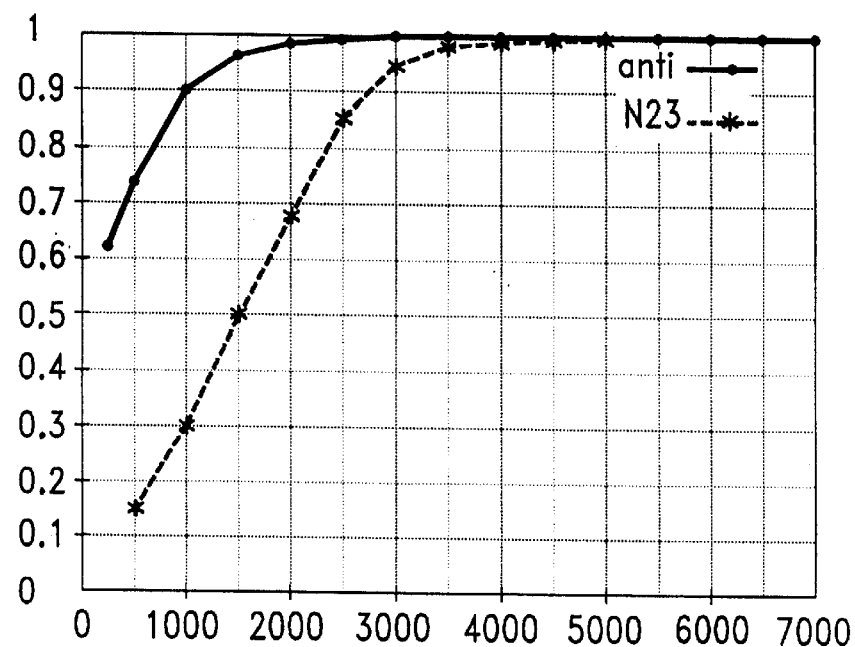
FIGS. 3 and 4 represent curves comparing the relative output bit rate obtained with the process and device of the present invention with the relative output bit rate obtained with the prior process described by H. T. Kung in the aforementioned article.

For simplicity, in what follows only two adjacent nodes, one of which behaves as a data sender and the other as a receiver, are considered within a packet data transmission digital network.

It will be assumed that the sender node 10, which will be denoted by the term "sender" for simplicity, is fed from several sources (FIG. 1) and must transmit data in the form of packets originating from these various sources over a link 12 to a receiver 14 while taking account of the capacity of the receiver to receive these data. The link 12 must thus support several virtual channels VC1, VC2, . . . , VCn corresponding to the various sources. The sender 10 includes input buffers 16 in which the data packets originating from the sources accumulate. An output multiplexer 18 of the sender makes it possible to transfer the data packets over the link 12. On its side, the receiver 14 includes one input buffer 20 per virtual channel. Depending on the address carried by the data packets received over the link 12, the receiver directs them towards one or other of the input buffers 20.

The data packets, made up of sets of data in digital form, may have a fixed size in terms of bytes, thus facilitating determination of the credits, or a variable size. Here, only packets of fixed length will be involved.

A data packet which arrives at the sender having originated from a source or a transmission node located upstream is stored in the corresponding queue of the sender if the latter does not dispatch it downstream immediately. Within a virtual channel, the data packets carry a sequence number and are transmitted by the sender in the order of their sequence number.

The receiver 14 includes a module 22 (FIG. 2) intended for monitoring the fill level of the buffers 20 and a sender 23 intended for constructing "credit" packets and rejection detection packets DR and for dispatching them to the sender 10 over the link 12. Each credit packet contains, for each virtual channel, the identification of the number of packets which it can accept, for example by giving the highest number of the packet which it is ready to receive over this virtual channel. In practice, the buffers 20 may constitute a single component whose slots are shared between the virtual channels, either statically (that is to say fixed once and for all), or dynamically.

In a network of known type which uses the credit allocation approach, the sender is authorized to send data packets corresponding to a specified virtual channel if it has not exhausted the number of credits which it has received from the receiver. To do this, the sender includes a memory into which the credits originating from the receiver are loaded and which is decremented as and when packets are sent. Thus, the receiver is certainly able to forward, to local users or onto downstream outputs, the data packets which arrive.

In accordance with the invention, the sender is constructed so as to be able to dispatch data packets relating to a specified virtual channel although it has exhausted the credits corresponding to this virtual channel, but only in particular cases, as will be seen later.

The packets sent in advance which arrive at the receiver are in danger of being rejected if the receiver no longer has any free slots in the input buffer. To allay this danger, the sender preserves each data packet sent in advance.

For simplicity, FIG. 2 shows a single input buffer 16, with static assignment of the available slots to the various virtual channels. The credits are stored in a memory 24 and the availabilities are indicated continuously to a management facility 28 which includes the multiplexer 18. The management facility 28 also includes a register 38 for each virtual channel, which contains the sequence number of the next data packet to be transmitted over this virtual channel. The management facility 28 may in particular be programmed to bring about the following mode of operation:

after sending a data packet, the corresponding register 38 contains the next sequence number for this virtual channel;

when a rejection detection packet DR is received, the sequence number contained in this packet is written to the corresponding register 38 and the data packets, necessarily sent in advance, whose sequence number is less than the number indicated in the packet DR, are removed from the buffer 16; sending in advance over this virtual channel is then prohibited;

when a packet of credits is received, the data packets, necessarily sent in advance, whose sequence number is less than the number indicated in the packet of credits are removed from the buffer 16. If sending in advance was prohibited and if the sequence number contained in the packet of credits received is greater than or equal to that of the first data packet to be sent, indicated in the corresponding register 38, then sending in advance over this virtual channel is authorized once again;

so long as the sender possesses non-empty queues, it transmits data packets from these queues, servicing as a priority those of its queues for which the sequence number contained in the last packet of credits received originating from the receiver is strictly greater than the sequence number of the last data packet dispatched. These data packets are immediately erased from the buffer 16;

the sender then services in advance those of its queues for which sending in advance is authorized, for which the sequence number contained in the last packet of credits received is less than or equal to the sequence number of the last data packet dispatched and for which the difference between these two sequence numbers is smallest, the sender preserving the data packets thus sent.

At receiver level, the loss of a packet may be discerned by detecting the fill of a buffer and identifying the serial number of the packet or packets received but not stored owing to overflow of the buffers.

Figure 4:
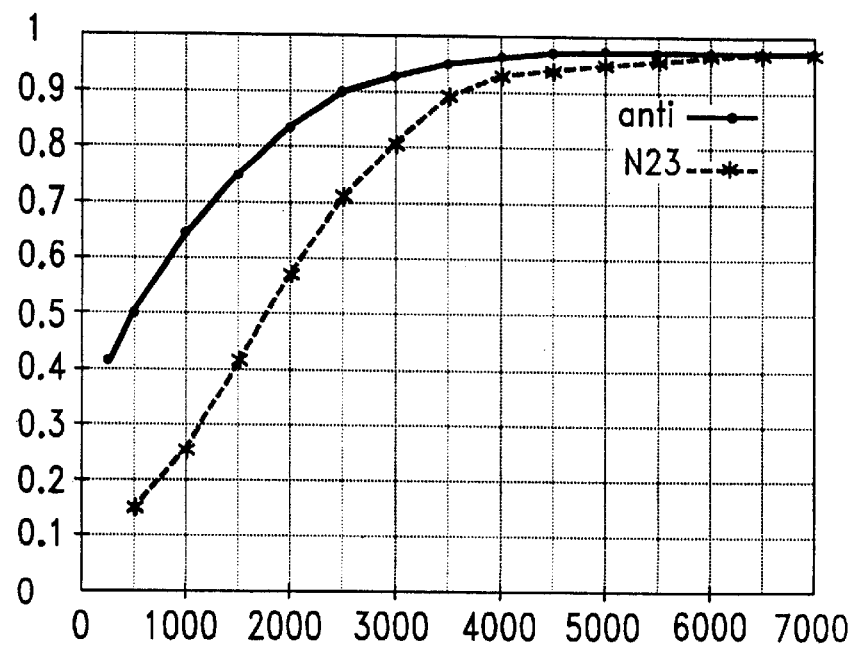

Very satisfactory results were obtained during simulations. By way of example, FIGS. 3 and 4 represent a comparison of the relative output bit rates obtained respectively with the process and the device in accordance with the present invention (continuous-line curves), and with the so-called "N23" method proposed by H. T. Kung and described in the article cited in the introduction (dashed curves).

The relative output bit rate is defined as the ratio between the total number of packets delivered by the receiver and the total number of packets generated by the sources.

The curves of FIGS. 3 and 4 represent the relative output bit rate as a function of the total size of the buffer of the receiver, expressed as a number of packets. Each point of a measurement curve corresponds to the flowing of $3.10^6$ packets. These curves correspond to two different values of the "blocking phase".

It is known that the output from each virtual channel exhibits phases of availability and phases of blocking. The duration of a blocking phase is expressed as a number of "packet times" during which the receiver cannot empty its buffer, a "packet time" being the send duration for a packet. In FIGS. 3 and 4, the proportion of the blocking phase is 50% and the propagation time Rtt is equal to 2400 packet times. For the curves of FIG. 3, the mean duration of a blocking phase is 200. For the curves of FIG. 4, this mean duration is 720.

In both cases, it is observed that the present invention allows better utilization of the resources. For a short duration of blocking phase, the gain of the present process is very large for a small size of the buffer (FIG. 3); for a large duration of blocking phase, the gain of the present process, relatively not so large for a small buffer size, is appreciable, even for a relatively large buffer (FIG. 4).

Other simulation results have also shown that the performance of the present process is all the better the larger the number of virtual channels.

What is claimed is:

1. A method for allocating resources in a packet data transmission digital network, between a data sender node and an adjacent data receiver node which resends in the downstream direction, in which:

(a) the receiver node dispatches to the sender node packets of credit containing information about the capacity of the receiver node to receive data packets originating from said sender node;

(b) the sender node dispatches the data packets which are to be transmitted so long as it has sufficient credits;

said method further including:

(c) continuing to dispatch in advance at said sender node the waiting data packets which are to be transmitted when said credits are exhausted and preserving each data packet sent in advance until reception thereof is confirmed by the arrival of specific packets originating from said receiver node;

(d) dispatching from said receive node to said sender node information indicating the lost data packets;

(e) retransmitting from said sender node the data packets whose loss has been signalled by said receiver node and destroying the data packets which were sent in advance and preceding the lost data packets.

2. The method according to claim 1, wherein the data packets sent bear a sequence number and the packets of credits contain the highest one of said sequence numbers of said data packets which the receiver is ready to receive.

3. The method according to claim 2, in which the sender node processes several queues respectively associated with several network propagation channels and in which the data packets are sent in the order of their sequence number, wherein the sender node first transmits data packets originating from those of the queues for which the sequence number contained in the last packet of credits received originating from the receiver is strictly greater than the number of the last data packet dispatched, and the sender node then transmits, in advance, data packets originating from those of the queues for which sending in advance is authorized, for which the sequence number contained in the last packet of credits received originating from the receiver node is less than or equal to the number of the last data packet dispatched and for which the difference between the two sequence numbers is smallest, the sender node preserving the data packets transmitted in advance.

4. The method according to claim 2, in which the receiver node possesses several queues associated with several network propagation channels, wherein upon the arrival of a data packet with sequence number m which cannot be admitted at the receiver, through lack of space in the corresponding queue, while the preceding data packet in respect of this queue has been admitted, the receiver node dispatches to the sender node a rejection detection packet which includes the sequence number m and systematically rejects all the succeeding data packets, until the arrival, by retransmission, of a fresh version of that data packet whose sequence number is m.

5. The method according to claim 3, further including destroying at said sender node all the data packets, necessarily sent in advance and whose sequence number is less than or equal to the sequence number indicated in the packet of credits when said sender node receives a packet of credits originating from said receiver node.

6. The method according to claim 4, further including destroying at said sender node all the data packets necessarily sent in advance and whose sequence number is less than the sequence number indicated in the rejection data packet when said sender node receives a rejection detection packet originating from said receiver node.

7. The method according to claim 4, further including disabling at said sender node the sending in advance of data packets in respect of the relevant propagation channel, until the arrival of a packet of credits which includes a sequence number greater than or equal to the sequence number of the first data packet still waiting to be resent or transmitted next over this propagation channel when said sender node receives a rejection detection packet originating from said receiver node.

8. The method according to claim 1, wherein the receiver node dispatches a packet of credits to the sender node as soon as one or the other of the following events occurs: (i) the number of data packets which have departed heading downstream since the sending of the last packet of credits to the sender node is equal to a predetermined number; (ii) a predetermined duration of non-sending of packets of credits has elapsed since the sending of the last packet of credits to the sender node.

9. A device for allocating resources in a packet data transmission digital network, comprising:

a data receiver node which includes
   a predetermined number n of input buffers, respectively associated with n virtual channels which correspond to several sources for sending data in the network,
   means for monitoring the fill level of said input buffers, said means being connected to each of the buffers, and
   sending means connected to said monitoring means, said sending means being adapted for constructing packets of credits and rejection detection packets containing information about the capacity of the receiver node to receive data packets;

a data sender node which includes
   n input buffers respectively associated with said n virtual channels,
   memory means for storing the values of said credits, said values being updated upon receipt of a packet of credits originating from the receiver node and upon the sending of a data packet to the receiver node,
   management means, connected to said memory means, said management means further including output multiplexing means and a plurality of registers respectively associated with said n virtual channels, each register of said plurality of registers containing a sequence number of the next data packet to be transmitted over the respective virtual channel, said management means being programmed and thus adapted so as to control the transmission to said receiver node as a function of said values of credits with said packet data transmission occurring possibly in advance, to control, when a rejection detection packet is received originating from said receiver node, the deletion from the input buffer of the relevant virtual channel of those data packets whose sequence number is less than the number indicated in said rejection detection packet and the prohibiting over said relevant virtual channel of the transmission in advance, and to control when a packet of credits is received the deletion from the buffer of the relevant virtual channel of those data packets, necessarily sent in advance, whose sequence number is less than or equal to the number indicated in said packet of credits and the possible reactivation of the sending in advance if the latter was prohibited; and a transmission link joining said sender node to said receiver node and over which are sent, on the one hand, data packets from said sender node to said receiver node, and, on the other hand, packets of credits and rejection detection packets from said receiver node to said sender node.

* * * * *